March 14, 1944.　　　H. S. SINGLETON　　　2,344,424
WELDED PIPE INSTALLATION
Filed Feb. 17, 1943
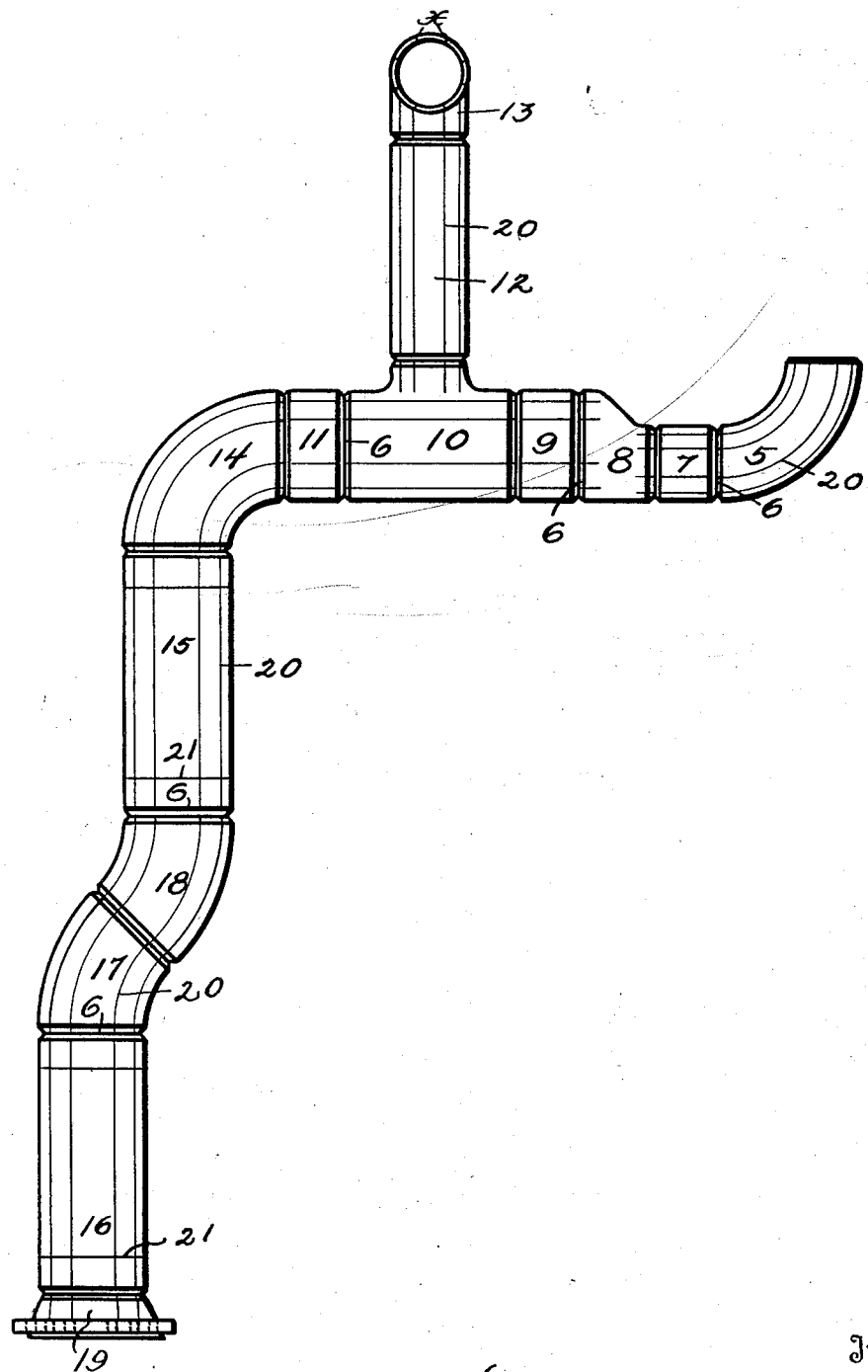
Inventor
Howard S. Singleton
By Shepherd & Campbell
Attorney Patented Mar. 14, 1944

2,344,424

UNITED STATES PATENT OFFICE 2,344,424

WELDED PIPE INSTALLATION

Howard S. Singleton, Alexandria, Va.

Application February 17, 1943, Serial No. 476,239

1 Claim. (Cl. 285—111)

The purpose of the present invention is to provide an improved method of and means for facilitating the erection of welded pipe installations.

The primary object is to provide such indicia upon the various runs and fittings of the pipe as will greatly reduce the time required as well as the cost in making such installations.

The figure shown in the accompanying drawing is a plan view of a pipe assembly, chosen for the purpose of illustrating the general principles involved, the invention not being limited to any particular assembly.

The drawing illustrates a long radius L 5, welded at 6 to a short pipe 7. The welds are indicated by the reference character 6 throughout the drawing. Pipe section 7 is welded to an eccentric reducer 8 that is in turn welded to a short pipe 9. A T 10 connects pipes 9 and 11. The outlet of the T is welded to pipe 12, the latter terminating in a fitting 13 which may be either an L or a T. A short radius 90° L 14 is welded to pipe 11 and to a straight run of pipe 15. Another but offset straight run of pipe 16 is connected to the run 15 by two 45° fittings 17 and 18. Pipe 15 is welded to a welding neck flange 19.

The several pipes and fittings are provided with indicia in the form of lines 20. These lines are coequal in number and spacing, circumferentially about the several pipes and fittings and they are preferably eight in number upon each pipe and fitting. Thus the several lines are spaced 45° apart (see X at the top of the drawing).

This invention goes materially beyond the mere idea of providing matching lines upon two parts intended to be circumferentially adjusted with respect to each other. This essential difference arises from the fact that the conditions and difficulties existing in the erection of welded pipe are wholly different from those existing in the case of conventional threaded pipe. In the term welded pipe I include any threadless pipe in which the joints are secured by welding, soldering, sweating or the like. When erecting threaded pipe the threads themselves constitute aligning means for making the various runs and fittings lie at a determined angle with respect to each other, in the general direction of the run, while in the matter of circumferential adjustment of L's, T's, and the like it is a mere matter of turning the fitting a little more or a little less upon its threads. No such adjustable support as these threads is present in the case of welded pipe and present practice requires the use of two men, using two levels, simultaneously, to get the various pipes and fittings at the proper angles and circumferential adjustments, before welding is effected. This necessity for employing two men and levels is eliminated by the use of the present invention because the lines 20 provide means by which a single workman can properly position the pipes and fittings with the assurance that when, say a T has been set one mark to the right of the center of a companion pipe or fitting, it will be found lying at a true 45° angle with respect to such companion fitting. Thus a workman can proceed speedily with a main run of pipe, leaving such side outlets as may be necessary with full confidence that expensive mistakes will be avoided.

An important feature of the invention resides in the fact that the lines 20 upon the straight runs of pipe extend throughout the full length of such runs. Thus the workman may cut lengths of pipe as required and always find the necessary markings present at the pipe ends for alignment and adjustment with respect to companion fittings.

To further facilitate the erection of the pipe construction I may provide the pipe sections with transverse lines 21 spaced determined distances apart, say a foot apart, throughout the length of the pipe sections. Thus the workman will not have to measure for feet, but need measure only for the odd inches in cutting a given length of pipe.

It will be an easy matter to scribe the lines 20 on the pipe sections in the manufacture of the latter, and it will be relatively simple to indent or otherwise form the markings upon the other fittings. I prefer to have the markings straddle the center line of the fittings as indicated at X at the top of the drawing. The invention is not limited to any particular arrangement of marks nor to any particular way of forming the same. It includes within its purview whatever changes fairly come within either the terms or the spirit of the appended claim.

Having described my invention, what I claim is:

A plurality of threadless weldable pipe fittings complementally making up a run of threadless welded pipe, and wherein at least some of said fittings lie at an angle to the adjoining fittings in the length of said run, said fittings each having a plurality of indicating marks spaced equidistantly in degrees therearound and coacting with the marks of adjoining fittings to indicate the degree of angular offset in the line of any angularly disposed fitting, some of the fittings comprising straight nipples or pipe sections and said indicating marks upon the latter fittings extending from end to end of said fittings so that said marks will be present to perform their function of determining the angular offset of an adjacent fitting irrespective of the point at which such straight section or fitting may be cut off.

HOWARD S. SINGLETON.